United States Patent
Ish-Shalom et al.

(10) Patent No.: US 6,299,346 B1
(45) Date of Patent: Oct. 9, 2001

(54) ACTIVE PYROMETRY WITH EMISSIVITY EXTRAPOLATION AND COMPENSATION

(75) Inventors: Yaron Ish-Shalom, Kiryat Tivon (IL); Yael Baharav, Palo Alto, CA (US)

(73) Assignee: C. I. Systems LTD, Migdal Haemek (IL)

( * ) Notice: Subject to any disclaimer, the term of this patent is extended or adjusted under 35 U.S.C. 154(b) by 0 days.

(21) Appl. No.: 09/521,113

(22) Filed: Mar. 7, 2000

Related U.S. Application Data
(60) Provisional application No. 60/123,371, filed on Mar. 8, 1999.

(51) Int. Cl.[7] .................................................. G01K 5/06
(52) U.S. Cl. .......................... 374/126; 374/127; 374/128; 374/130; 374/134; 374/131
(58) Field of Search ..................................... 374/134, 126, 374/128, 130, 132, 131, 127, 121

(56) References Cited

U.S. PATENT DOCUMENTS

| | | | |
|---|---|---|---|
| 3,057,200 | 10/1962 | Wood | 374/123 |
| 3,427,861 | 2/1969 | Maley | 374/5 |
| 3,433,052 | 3/1969 | Maley | 374/5 |
| 3,537,314 | 11/1970 | Svet . | |
| 3,611,805 | 10/1971 | Hishikari . | |
| 3,672,221 | 6/1972 | Well | 73/339 R |
| 3,745,830 | 7/1973 | Smith, Jr. | 73/344 |
| 3,796,099 | 3/1974 | Shimotsuma | 73/355 EM |
| 4,037,470 | 7/1977 | Mock et al. | 73/19 EW |
| 4,120,582 | 10/1978 | DeVries et al. | 356/73 |
| 4,156,461 | 5/1979 | Cha | 166/256 |
| 4,417,822 | 11/1983 | Stein et al. | 374/129 |
| 4,470,710 | 9/1984 | Crane et al. | 374/127 |
| 4,561,786 | 12/1985 | Anderson | 374/127 |
| 4,647,220 | 3/1987 | Adams et al. | 374/124 |
| 4,647,774 | 3/1987 | Brisk et al. | 250/338 |
| 4,708,493 | 11/1987 | Stein | 374/128 |
| 4,733,079 | 3/1988 | Adams et al. | 250/341 |
| 4,790,669 | 12/1988 | Christensen | 374/131 |
| 4,841,150 | 6/1989 | Walter | 250/339 |
| 4,881,823 | * 11/1989 | Tanaka et al. | 374/126 |
| 4,890,245 | 12/1989 | Yomoto et al. | 374/61 |
| 4,919,542 | 4/1990 | Nulman et al. | 374/9 |
| 4,956,538 | 9/1990 | Moslehi et al. | 219/121.6 |
| 4,969,748 | 11/1990 | Crowley et al. | 374/1 |
| 4,979,133 | 12/1990 | Arima et al. | 364/557 |
| 4,979,134 | 12/1990 | Arima et al. | 364/557 |
| 5,004,913 | 4/1991 | Kleinerman | 250/227.21 |

(List continued on next page.)

FOREIGN PATENT DOCUMENTS

US92/03456  4/1992  (WO) .
IL96/00102  9/1996  (WO) .

OTHER PUBLICATIONS

X. Maldague et al. Dual imager and its applications to active robot welding surface inspection, and two–color pyrometry. Optical engineering. vol. 28, No. 8, Aug. 1989.*

*Primary Examiner*—Diego Gutierrez
*Assistant Examiner*—Gail Verbitsky
(74) *Attorney, Agent, or Firm*—Mark M. Friedman

(57) ABSTRACT

A method and apparatus for active pyrometric measurement of the temperature of a body whose emissivity varies with wavelength. The emissivity is inferred from reflectivity measured at two wavelengths in an irradiation wavelength band and extrapolated to a wavelength in an emission wavelength band. The extrapolated emissivity is used to correct a blackbody estimate of the temperature of the body in the emission wavelength band. The extrapolation, being temperature-dependent, is done iteratively. Both reflectivity and emission measurements are performed via a common optical head that is shaped, and is positioned relative to the body, so that the optical head has a sufficiently large solid angle of acceptance that the measured temperature is independent of superficial roughness of the body.

35 Claims, 6 Drawing Sheets

U.S. PATENT DOCUMENTS

| | | | |
|---|---|---|---|
| 5,029,117 | 7/1991 | Patton | 364/557 |
| 5,114,242 | 5/1992 | Gat et al. | 374/128 |
| 5,118,200 | 6/1992 | Kirillov et al. | 374/120 |
| 5,132,922 * | 7/1992 | Khan et al. | 364/557 |
| 5,154,512 | 10/1992 | Schietinger et al. | 374/9 |
| 5,156,461 | 10/1992 | Moslehi et al. | 374/121 |
| 5,165,796 | 11/1992 | Gat et al. | 374/128 |
| 5,170,041 | 12/1992 | Amith et al. | 219/497 |
| 5,226,732 * | 7/1993 | Nakos et al. | 374/133 |
| 5,231,595 * | 7/1993 | Makino et al. | 364/557 |
| 5,305,416 | 4/1994 | Fiory | 392/416 |
| 5,310,260 | 5/1994 | Schietinger et al. | 374/142 |
| 5,318,362 | 6/1994 | Schietinger et al. | 374/142 |
| 5,326,172 * | 7/1994 | Ng | 374/126 |
| 5,326,173 * | 7/1994 | Evans et al. | 374/128 |
| 5,347,128 | 9/1994 | Puram et al. | 250/330 |
| 5,460,451 | 10/1995 | Wadman | 374/126 |
| 5,490,728 | 2/1996 | Schietinger et al. | 374/7 |
| 5,704,712 * | 1/1998 | Stein | 374/126 |
| 5,714,392 | 2/1998 | Dawson et al. | 437/8 |
| 5,717,608 | 2/1998 | Jensen | 374/100 |
| 5,727,017 | 3/1998 | Maurer et al. | 374/9 |
| 5,738,440 | 4/1998 | O'Neill et al. | 374/9 |
| 5,762,419 | 6/1998 | Yam | 374/2 |
| 5,769,540 | 6/1998 | Schietinger et al. | 374/127 |
| 5,772,323 * | 6/1998 | Felice | 374/127 |
| 5,823,681 | 10/1998 | Cabib et al. | 374/126 |
| 5,993,059 * | 11/1999 | O'Neill et al. | 374/126 |
| 6,012,840 * | 1/2000 | Small, IV et al. | 374/126 |
| 6,027,244 * | 2/2000 | Champitier et al. | 374/130 |

* cited by examiner

ACTIVE PYROMETRY WITH EMISSIVITY EXTRAPOLATION AND COMPENSATION

This Application claims benefit of Provisional No. 60/123,371 filed Mar. 8, 1999.

FIELD AND BACKGROUND OF THE INVENTION

The present invention relates to non-contact, optical determination of the temperature of a body. More particularly, the present invention relates to a method and apparatus for non-contact, optical determination of the temperature of a wafer of semiconductor material during processing, for the manufacturing of integrated circuits. A review of the need for wafer temperature monitoring, during processing, can be found in Graham Jackson, Yael Baharav and Yaron Ish-Shalom, "The use of temperature monitoring in advanced semiconductor industry processing", *Business Briefing of the Association of South East Asian Nations: Semiconductor Manufacturing Technology*, pp. 93–96, 1998.

Pyrometry is a well-known non-contact method of determining the temperature of a body such as a semiconductor wafer undergoing processing. As is well known, pyrometry infers the temperature of a body from the intensity of the electromagnetic radiation emitted by the body at different wavelengths (self-emission). According to Planck's radiation formula, the intensity of the radiation $E_{b\lambda}d\lambda$ emitted by an ideal blackbody in the wavelength band between wavelength $\lambda$ and wavelength $\lambda+d\lambda$ is given by:

$$E_{b\lambda}d\lambda = \frac{hc^3}{\lambda^5} \frac{d\lambda}{\exp(hc/k\lambda T) - 1} \quad (1)$$

where h is Planck's constant, c is the speed of light, k is Boltzmann's constant, and T is the temperature of the blackbody. In the case of a real body, equation (1) must be modified as follows:

$$E_\lambda d\lambda = \frac{hc^3}{\lambda^5} \frac{d\lambda}{\exp(hc/k\lambda T) - 1} \varepsilon(\lambda) \quad (2)$$

where $\epsilon(\lambda)$ is the (usually wavelength-dependent) emissivity of the body. For an ideal blackbody, $\epsilon(\lambda)$ is identically equal to 1 at all wavelengths. For an opaque (zero transmittance) body, the emissivity and the reflectivity R are related by a special case of the law of energy conservation, in combination with Kirchoff's law that states that the absorptivity of the body and the emissivity of the body are equal:

$$\epsilon(\lambda)+R(\lambda)=1 \quad (3)$$

It should be noted that equations (1) through (3) hold for each wavelength separately. This is important for the discussion below about emissivity-compensated temperature measurements of bodies with wavelength-dependent emissivity.

With regard to the angular distribution of the emitted radiation, and the behavior of $\epsilon(\lambda)$ and $R(\lambda)$ as functions of angle:

(i) in the case of a blackbody, $E_{b\lambda}d\lambda$ is Lambertian: the radiant intensity per unit steradian is proportional to $\cos(\theta)$, where $\theta$ is the angle between the line of sight and the normal to the radiating surface;

(ii) equation (2) expresses the total intensity integrated over all solid angles, whereas the angular dependence of $E_\lambda d\lambda$ depends on the physical properties of the radiating object;

(iii) equation (3) is valid for two different situations, that in which $\epsilon(\lambda)$ and $R(\lambda)$ are integrated over an arbitrary solid angle, and that in which $\epsilon(\lambda)$ and $R(\lambda)$ are measured in a specific direction, as long as both $\epsilon(\lambda)$ and $R(\lambda)$ are integrated over the same solid angle, or as long as $\epsilon(\lambda)$ and $R(\lambda)$ are measured in the same direction.

In active pyrometry, the emissivity of an opaque body is determined by directing radiation of a known intensity at the body, receiving reflected radiation from the body, inferring the reflectivity of the body from the intensities of the incident and reflected radiations, and subtracting the reflectivity from 1 to obtain the emissivity. A representative patent in this field is Patton, U. S. Pat. No. 5,029,117, which is incorporated by reference for all purposes as if fully set forth herein. Patton measures the temperature of a semiconductor wafer by directing radiation from a source at the back side of the wafer, and passing light reflected and emitted by the wafer to a detector via a rotating slotted disc. The detector produces signals that are alternately representative of the intensity of combined reflected and emitted radiation, representative of the intensity of emitted radiation only, and representative of background. From these signals, the temperature of the wafer is inferred.

It is well known that, if a body has a known emissivity, which is constant as a function of wavelength but which may or may not vary as a function of temperature, then a radiometric measurement of self-emission in one single wide wavelength band provides enough data to accurately derive the temperature of the body. However, if the emissivity of the body is a function of wavelength, then the temperature can be accurately derived from self-emission measurements only if the signals are acquired in one or more narrow wavelength bands. (One narrow wavelength band suffices if the emissivity at that wavelength is known; otherwise, two or more narrow wavelengths bands are needed.) This is because a wide band measurement gives a signal which is proportional to the integral of the product of two wavelength-dependent functions, the emissivity and the blackbody Planck function of equation (2), and as a result, there is in general no unique correspondence between the self-emission signal and the temperature of the measured object. Pyrometric methods such as Patton's do not use narrow wavelength bands, and so are suboptimal for measuring the temperature of semiconductor wafers undergoing processing.

The emissivity of a silicon wafer undergoing processing is often a strong function of wavelength. FIG. 1 shows the emissivity of a silicon wafer with two layers, polysilicon above silicon dioxide, deposited on the silicon substrate of the wafer, as a function of wavelength. The thickness of the silicon dioxide layer is 1000 Å. Five different thicknesses of polysilicon are shown, as indicated. This wavelength dependence degrades the accuracy of the temperature measurement.

This variation of emissivity with wavelength has been addressed by "multi-wavelength pyrometry", most commonly by a special case thereof, dual wavelength pyrometry. Stein, in U. S. Pat. No. 4,708,493, uses a dichroic beam splitter to gather reflected radiation and emitted radiation in two identical narrow wavelength bands. The two reflection signals from two separate diode lasers are used to estimate the emissivity of a body in the same wavelength bands. These emissivity values are then used together with the self-emission signals in the same bands to derive the temperature of the body. Gat et al., in U. S. Pat. No. 5,114,242, and Glazman, in WO 97/11340, obtain temperature and emissivity in a self-consistent manner from measurements of emitted radiation in several wavelength bands. These and similar methods require relatively complicated optical systems.

In principle, it is preferable to measure the emissivity directly at the same wavelength as the self-emitted radiation is measured. However, application considerations (specific production processes require different working temperature ranges) and engineering considerations (commercially available radiation sources and detectors yielding appropriate signal to noise ratio) may dictate that the emissivity be measured in different wavelength bands than the one in which the self-emitted radiation is measured. In general, as part of the design considerations, there is also the need to measure the self-emission from the same area on the wafer as the emissivity is measured (for the emissivity correction mentioned above), in order to avoid errors associated with non-uniformity of the thickness of films deposited on a semiconductor wafer, as a consequence of the dependence of the emissivity on the film thickness, as illustrated in FIG. 1.

For the past several years, C. I. Systems Ltd., of Migdal HaEmek, Israel, has been developing and selling systems for measuring the temperatures of semiconductor wafers during processing. Their first product, the NTM1, is an instrument that measures the temperature by using the temperature dependence of the absorption edge of the indirect band gap of silicon. This method is described in Michael E. Adel, Yaron Ish-Shalom, Shmuel Mangan, Dario Cabib, and Haim Gilboa, "Noncontact temperature monitoring of semiconductors by optical edge sensing", *Advanced Techniques for Integrated Circuit Processing* II, SPIE Vol. 1803, pp. 290–298, 1993; J. A. Roth, J.-J. Dubray, D. H. Chow, P. D. Brewer and G. L. Olson, "Feedback control of substrate temperature and film composition during MBE growth of lattice-matched InGaAs on InP", Invited Talk at $9_{th}$ *Conference on InP and Related Materials*, IPRM '97, Hyannis, M A, May 11–15, 1997; T. J. de Lyon, J. A. Roth, and D. H. Chow, "Substrate temperature measurement by absorption-edge spectroscopy during molecular beam epitaxy of narrow-band gap semiconductor films", *J. Vac. Sci. Technol. B*, Vol. 15 No. 2, pp. 329–336, March/April 1997; and J. A. Roth, T. J. de Lyon and M. E. Adel, "In-situ substrate temperature measurement during MBE by band-edge reflection spectroscopy, *Mat. Res. Soc. Symp. Proc.*, Vol. 324, pp. 353–358, 1994.

Absorption edge temperature sensing, as implemented in the NTM1, has, among its other advantages, the advantage that it exploits a phenomenon related to the shape of the spectral reflectance curve. Because this method is not based on the intensity of self-emitted radiation, the NTM1 can measure the temperatures of wafers processed at lower temperatures, and its accuracy is less sensitive than pyrometric methods to absolute measurement of the intensity of radiation. However, the method has disadvantages, such as the fact that interference effects, due to multiple layers of materials of different types deposited on the wafer, tend to distort or wash out the absorption edge effect, effectively reducing the accuracy and the temperature range of the measurement. In addition, absorption edge sensing is not suitable for certain types of wafers, for example highly doped wafers, because these do not have an absorption edge. Obviously, it is desirable that an in-situ temperature monitor, suitable for the production environment, be able to function with all or almost all types of wafers. A version of the NTM1 with an additional self-emission measurement channel has been developed, to include highly doped wafers in its repertoire, but the final instrument cost is too high for production applications, due to the need for spectral measurements.

In order to expand the population of wafers that can be measured, and improve the measurement accuracy and repeatability, C. I. Systems Ltd. introduced the NTM5, a second-generation non-contact, in-situ temperature monitor for wafer processing, based on the measurement of the wafer's self-emission. With the NTM5, C. I. Systems Ltd. introduced the concept of "radiance contrast tracking" (RCT), augmented by emissivity compensation. This method is described in U.S. Pat. No. 5,823,681, to Cabib et al., which is incorporated by reference for all purposes as if fully set forth herein, and in Michael E. Adel , Shmuel Mangan and Yaron Ish-Shalom, "Emissivity compensated, radiance contrast tracking pyrometry for semiconductor processing", *Microelectronic Processors Sensors, SPIE Proceedings*, Vol. 2091, pp. 311–322, 1993.

Radiance contrast tracking is based on the observation that the blackbody Planck function versus wavelength has a maximum that shifts t o short wavelengths as the temperature rises. As a result, different temperature ranges can be measured more efficiently in different wavelength ranges. Furthermore, the errors introduced in the wafer temperature measurement, by factors such as: wafer emissivity, background radiation, and inherent detector and electronic noise, are also wavelength dependent. As a result, in order to be able to measure wafer temperature in a relatively wide temperature range (about 100 C to 600 C) with the required accuracy, the NTM5 was designed to measure at several wavelengths simultaneously, by means of several detectors, that are sensitive in different regions of the spectrum, in a sandwich configuration. In cases where large wafer to wafer emissivity variation is expected, the system is augmented by a wafer emissivity compensation station, which allows emissivity compensation of each wafer by reflection and transmission spectroscopy. Application of the NTM5 to wafer temperature monitoring during Physical Vapor Deposition (PVD) is described in Michael E. Adel, Shmuel Mangan, Howard Grunes, and Vijay Parkhe, "True wafer temperature during metallization in physical vapor deposition cluster tools", *SPIE* Vol. 2336, pp. 217–226, 1994.

The NTM5 also addresses another limitation of prior art methods in which the light is received by the detector from the wafer over only a limited range of solid angles, a limitation that makes the measurement sensitive to superficial roughness of the wafer. There are two optical configurations that compensate for superficial roughness: one in which the wafer is illuminated hemispherically (solid angle of $2\pi$ steradians) by the incident radiation, and in which the reflected radiation and the self-emitted radiation are collected from the same solid angle, and another in which the wafer is illuminated from any solid angle and the reflected and self-emitted radiations are collected hemispherically. In practice, it suffices to illuminate or receive radiation in a solid angle of a few steradians. Such a method is implemented in the NTM5, as described in U. S. Pat. No. 5,823,681. The optics of the wafer emissivity compensation station, and of the measurement probes that are used to measure temperature during processing, are designed to have identical, relatively large solid acceptance angles.

The NTM5 has the following disadvantages:

1. The need for an emissivity compensation station, which is a separate chamber where the reflectivity and transmittance are measured, for the estimation of the emissivity of each wafer, makes measurements with the NTM5 cumbersome, time consuming, and expensive.

2. The emissivity is temperature dependent, and therefore large inaccuracies may be introduced by the fact that the temperature of the wafer during processing is different th an the one in the emissivity compensation station.

There is thus a widely recognized need for, and it would be highly advantageous to have a method and apparatus for accurate, non-contact wafer temperature measurement, that can cope with strong variations of emissivity with wavelength and temperature, and with wafer surface roughness, and at the same time is compact, uses the minimum number of optical components, saves measurement time by avoiding a separate calibration chamber for emissivity compensation, does not need any moving parts, is sufficiently flexible to be adapted to work in different types of wafer production processes, and measures a large number of wafer types.

SUMMARY OF THE INVENTION

It is an object of the present invention to provide a non-contact method of measuring the temperature, of semiconductor wafers undergoing processing, that is highly accurate, using an apparatus that is small in size, simple to use, flexible enough to be adapted to different wafer production processes in different processing chambers, preferably has no moving parts, is suitable for the largest number of types of wafers, and costs less than known systems.

It is an object of the present invention to address a very complex mix of wafer parameters and design requirements, such as: wafer temperature range, required temperature accuracy, optical properties of the wafer including spectral emissivity and surface roughness, the need to avoid inaccuracies due to stray and background light in the processing chamber, and the availability of commercial optical components (illumination sources, detectors and filters needed for the system). As a result of these constraints, the optical design and the algorithms, used to obtain the wafer temperature on the basis of the measured optical signals, must be chosen very carefully. This combination of design and algorithms is non-trivial, because of the multiplicity of parameters involved in the problem, and because of the strong wavelength dependence of the infrared radiation emitted by a wafer. This strong wavelength dependence is due to the wavelength dependence, both of blackbody emission, and of the emissivity of the wafer, according to equations (1) and (2). The wavelength ranges of the light illuminating the wafer and of the detection of the reflected and self-emitted radiation, must be matched to the specific wafer production process (e.g. physical vapor deposition, rapid thermal processing, chemical vapor deposition, high density plasma-chemical vapor deposition, etc.). The lower limit of the temperature range, at which the wafer production process takes place, is especially important in establishing the preferred wavelength range, because at low temperatures the amount of self-emitted radiation decreases rapidly for fixed wavelength, reducing signal to noise ratio: however, the signal can be recovered by measuring at longer wavelengths. One of the innovative aspects of the present invention is in the fact that both the reflected and self-emitted radiation may be effectively measured in more than one wavelength range, despite the fact that only one filter is used in the optical path; and that these ranges and their widths can be changed by changing the spectral position and width of this filter. This greatly simplifies the apparatus of the present invention and reduces its cost.

It is an object of the present invention to provide a method and apparatus for non-contact determination of the temperature of a wafer of semiconductor material during processing, wherein the emissivity of the wafer is measured in two different wavelength bands, the self-emitted radiation of the wafer is measured in a third wavelength band, and then the temperature of the wafer is inferred by an iterative extrapolation of the emissivity in this third wavelength band, on the basis of the blackbody function and the emissivity correction.

According to the present invention there is provided a method for determining a temperature of a body that emits radiation at a plurality of wavelengths, the body having an emissivity that varies with wavelength, the body being located in an environment, the body having an absorption edge that depends on the environment, the method including the steps of: (a) determining the emissivity of the body in an irradiation wavelength band; (b) inferring the emissivity of the body in a first emission wavelength band, different from the irradiation wavelength band, from the emissivity in the irradiation wavelength band; (c) receiving radiation emitted by the body in the first emission wavelength band; (d) measuring a first signal representative of an intensity of the emitted radiation received from the body in the first emission wavelength band; and (e) inferring the temperature of the body from the first signal and from the emissivity determined in the first emission wavelength band.

According to the present invention there is provided an apparatus for determining a temperature of a body having an absorption edge, including: (a) a radiation source for emitting radiation in a first spectral range; (b) a detection mechanism for detecting radiation in a first subband of the first spectral range and in a second subband of the first spectral range, and for detecting radiation emitted by the body in at least one emission wavelength band different from the first and second subbands; and (c) a common optical head for directing the radiation in the first spectral range towards the body and for receiving, from the body, the radiation in the first and second subbands and the radiation in the at least one emission wavelength band.

According to the present invention there is provided an apparatus for determining a temperature of a body, including: (a) an optical head for receiving radiation emitted by the body, and (b) a mechanism for positioning the optical head relative to the body so that the temperature of the body, as determined by the apparatus, is substantially independent of the superficial roughness of the body.

According to the present invention there is provided an apparatus for determining a temperature of a body, including: (a) an optical head, having a distal end, for receiving radiation emitted by the body; and (b) a mechanism for positioning the optical head with the distal end facing the body; and wherein the distal end is shaped so as to render the temperature of the body, as determined by the apparatus, substantially independent of the superficial roughness of the body.

According to the present invention there is provided a method of measuring the temperature of each of a plurality of workpiece bodies as the workpiece bodies are processed sequentially, including the steps of: (a) providing a reference body; (b) providing an apparatus for directing incident radiation at the reference body, receiving reflected radiation from the reference body, receiving emitted radiation from each workpiece body as the each workpiece body is processed, and inferring, from the emitted radiation, the temperature of the each workpiece body; (c) performing an initial calibration of the apparatus with respect to the reference body, prior to the processing of the workpiece bodies; (d) including the reference body in the sequence of workpiece bodies, with at least one of the workpiece bodies following the reference body in the sequence; (e) performing a subsequent calibration of the apparatus with respect to the reference body, during the processing of the workpiece bodies; and (f) for each workpiece body in the sequence: (i) receiving the emitted radiation from the each workpiece body, and (ii) inferring the temperature of the each workpiece body from the emitted radiation, the inferring of the temperature of each at least one workpiece body that follows the reference body in the sequence being effected with reference to the calibrations.

According to the present invention there is provided a method of measuring the temperature of each of a plurality of workpiece bodies as the workpiece bodies are processed sequentially, including the steps of: (a) providing first and second reference bodies having known reflectivities; (b) providing an apparatus for directing incident radiation at one of the reference bodies, receiving reflected radiation from the one of the reference bodies, receiving emitted radiation from each workpiece body as the each workpiece body is processed, and inferring, from the emitted radiation, the temperature of the each workpiece body; (c) performing an initial calibration of the apparatus with respect to the first reference body, prior to the processing of the workpiece bodies; (d) including the second reference body in the sequence of workpiece bodies, with at least one of the workpiece bodies following the second reference body in the sequence; (e) performing a subsequent calibration of the apparatus with respect to the second reference body, during the processing of the workpiece bodies; and (f) for each workpiece body in the sequence: (i) receiving the emitted radiation from the each workpiece body, and (ii) inferring the temperature of the each workpiece body from the emitted radiation, the inferring of the temperature of each at least one workpiece body that follows the second reference body in the sequence being effected with reference to the calibrations.

According to the present invention, incident radiation is directed at the body, reflected radiation is received from the body, and emitted radiation is received from the body, using the same common optical head with a wide solid angle of emittance and acceptance. This optical head is positioned sufficiently close to the body, and is tapered towards the body, in a way that renders the temperature measurement thus obtained substantially insensitive to superficial roughness of the body. The incident radiation is directed at the body, and the reflected radiation is received, in two subbands of an irradiation wavelength band, to obtain two emissivity estimates in these two subbands. The emitted radiation is received in an emission wavelength band. The two values of emissivity that are determined in the irradiation wavelength band are extrapolated to the emission wavelength band, and the extrapolated emissivity value is used to correct the black-body temperature determined in the emission wavelength band. Because this extrapolation includes one or more temperature-dependent parameters, this extrapolation is effected diteratively.

The incident radiation is emitted by a radiation source in a first spectral range. The reflected radiation is filtered by a passband filter and detected by a first detector in a second spectral range and by a second detector in a third spectral range. The first subband of the irradiation wavelength band is the product of the passband and the first and second spectral ranges. The second subband of the irradiation wavelength band is the product of the passband and the first and third spectral ranges. Preferably, the first detector is at least partly transparent to radiation in the second subband, and the passband filter and the two detectors are in tandem, with the radiation collected by the optical head traversing the filter before being received by the two detectors, and with reflected radiation of the third spectral range collected by the optical head traversing the first detector and then being received by the second detector.

The first detector also detects radiation emitted by the body in a first emission wavelength band that is defined by the filter passband and by the second spectral range. Optionally, the second detector also detects radiation emitted by the body in a second emission wavelength band that is defined by the filter passband and by the third spectral range. Measuring the radiation emitted by the body in two emission wavelength bands increases the dynamic range of the apparatus.

The filter passband parameters are selected in accordance with the environment in which the body is situated. Most preferably, if the body has an absorption edge, the high cutoff wavelength of the filter passband is selected in accordance with the absorption edge, so that the body acts as a high-pass filter that blocks short wavelength environmental background radiation.

The apparatus of the present invention also includes a control system for activating the radiation source and for receiving, from the detectors, electrical signals representative of the intensity of the respective radiations detected by the detectors. The control system includes a processor for processing these signals to provide estimates of the emissivity of the body in the irradiation and emission wavelength bands and, finally, an estimate of the temperature of the body based on the measured intensity of radiation emitted by the body in the emission wavelength band.

Another aspect of the present invention is most relevant to the measurement of the temperature of workpiece bodies, such as semiconductor wafers, that are processed sequentially, as those workpiece bodies are processed. According to this aspect of the present invention, if the radiation source is stable over time, then an innovative calibration procedure is implemented to compensate for changes over time in the optical interface between the body and the detectors, in the detectors themselves and in the electronics of the control system. An initial calibration is performed using a reference body that is similar to the workpiece bodies that are to be processed sequentially. In this calibration, incident radiation from the radiation source is reflected from the reference body to the first detector. The signal produced by the first detector in response to this reflected radiation is recorded. Then, the reference body is introduced into the sequence of workpiece bodies. When, in the course of the sequential processing, the reference body arrives again at the apparatus of the present invention, the calibration is repeated, to provide another signal from the first detector in response to radiation reflected from the reference body; and a ratio of a function of the signal from the initial calibration to the same function of the signal from the subsequent calibration is used to correct the signals that the first detector produces in response to radiation emitted by the workpiece bodies that follow the reference body in the sequence. (Conceptually, this function of the signal can be thought of as the identity function, so that the correction ratio is the ratio of the two signals themselves; but, as will be seen below, this conceptual description is not quite accurate.)

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a method of active pyrometry, and an associated apparatus, which can be used to measure the temperature of a body whose emissivity may be a strong function of wavelength. Specifically, the present invention can be used to accurately measure the temperature of semiconductor wafers during processing, in a relatively wide range of temperatures, and particularly at relatively cool (order of 200° C.) temperatures.

The principles and operation of active pyrometry according to the present invention may be better understood with reference to the drawings and the accompanying description.

Figure 2A:
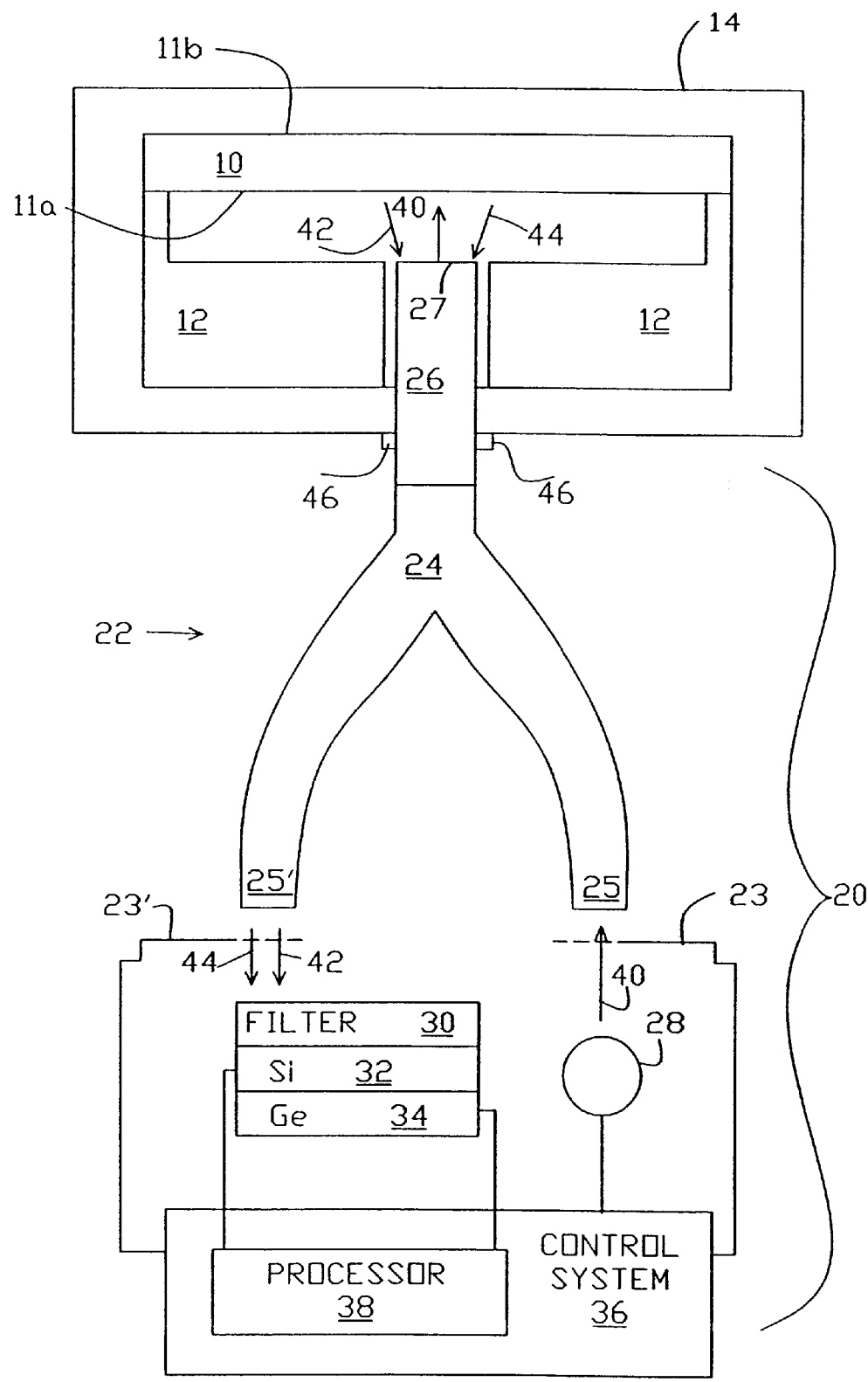
FIGS. 2A and 2B are schematic illustrations of apparati of the present invention.

Referring again to the drawings, FIG. 2A illustrates, schematically, an apparatus 20 of the present invention, used to measure the temperature of a silicon wafer 10 positioned on a support 12, which may be either a chuck or a pedestal, in a processing chamber 14. Apparatus 20 includes a radiation source 28, either a wide band radiation source, such as a halogen lamp, or a narrow band radiation source, such as an LED, for emitting incident electromagnetic radiation 40; a filter 30 for filtering reflected radiation 42 and emitted radiation 44; two detectors, a silicon detector 32 and a germanium detector 34 for detecting filtered reflected radiation 42 and filtered emitted radiation 44; an optical head 22 for directing incident radiation 40 from radiation source 28 towards back side 11a of wafer 10 and for receiving reflected radiation 42 and emitted radiation 44 from back side 11a of wafer 10 and directing the received reflected radiation 42 and the received emitted radiation 44 towards filter 30 and detectors 32 and 34; and a control system 36 for overall control of apparatus 20.

Optical head 22 includes: a cylindrical quartz rod 26; a bifurcated fiber optics cable 24, for conveying radiation between quartz rod 26 and components 28 and 30; and shutters 23 and 23'. Shutters 23 and 23' are drawn open, with their closed positions indicated in phantom. With shutter 23 open, radiation 40 from radiation source 28 enters branch 25 of fiber optics cable 24 and propagates via fiber optics cable 24 and quartz rod 26 to be incident on wafer 10. With shutter 23 closed, radiation 40 from radiation source 28 is blocked from entering branch 25 of fiber optics cable 24. Reflected radiation 42 and emitted radiation 44 from back side 11a of wafer 10 are collected by quartz rod 26 and propagate via quartz rod 26 and fiber optics cable 24 to branch 25' of fiber optics cable 24. With shutter 23' open, reflected radiation 42 and emitted radiation 44 are incident from branch 25' of fiber optics cable 24 onto filter 30 and detectors 32 and 34. With shutter 23' closed, reflected radiation 42, emitted radiation 44 and all background radiation are blocked by shutter 23' from reaching filter 30 and detectors 32 and 34.

Quartz rod 26 is inserted into chamber 14 via an aperture 18 and into support 12 via an aperture 16. Quartz rod is held inside chamber 14, by a bracket 46, with distal end 27 of quartz rod 26 at a distance from back side 11a of wafer 10 such that the solid emission/acceptance angle of radiation transiting between quartz rod 26 and back side 11a of wafer 10 corresponds to a cone having an apex angle of at least 80°. (An apex angle of 180° corresponds to hemispherical irradiation.) This angle is sufficiently large for the temperature determined by apparatus 20 to be independent, for all practical purposes, of the superficial roughness of back side 11a of wafer 10.

Note that the distance between distal end 27 of quartz rod 26 and back side 11a of wafer 10 is exaggerated in FIG. 2A, for illustrational clarity. Distal end 27 should be as close as possible to back side 11a without touching back side 11a.

Preferably, the emission maximum of radiation source 28 is at about 950 nm, with a spectral width of about 80 nm FWHM. The passband of a typical filter 30 is defined by a low wavelength cutoff of about 1000 nm, a high wavelength cutoff of about 1150 nm and a flat response between the two cutoff wavelengths. This passband is suitable, for example, for monitoring the temperatures of wafers 10 undergoing physical vapor deposition.

Preferably, silicon detector 32 responds to wavelengths in a band between about 400 nm and about 1250 nm, with a peak response at about 950 nm. Germanium detector 34 preferably responds to longer wavelengths, in a band from about 950 nm to about 2000 nm, with a peak response at about 1550 nm. Silicon detector 32 is partly transparent to the radiation in the sensitivity band of germanium detector 34. Silicon detector 32 and germanium detector 34 are mounted in tandem, as shown. Reflected radiation 42 and emitted radiation 44 arriving from optical head 22 via filter 30 is first incident on silicon detector 32. Reflected radiation 42 and emitted radiation 44 in the sensitivity band of silicon detector 32 is absorbed by silicon detector 32, causing silicon detector 32 to emit an electrical signal proportional to the intensity of the radiation in the sensitivity band of silicon detector 32 incident thereupon. Reflected radiation 42 and emitted radiation 44 in the sensitivity band of germanium detector 34 passes through silicon detector 32 to germanium detector 34 and is absorbed by germanium detector 34, causing germanium detector 34 to emit an electrical signal proportional to the intensity of the radiation in the sensitivity band of germanium detector 34 incident thereupon.

Preferably, radiation source 28 is a source such as an LED that can be modulated at high frequencies, and shutter 23 is an electronic shutter. In alternative embodiments of the apparatus of the present invention, in which radiation source 28 is a slowly switchable source, such as a halogen lamp, that cannot be modulated at high frequencies, shutter 23 may be a mechanical shutter or an electro-optical shutter. An electronic shutter or an electro-optical shutter has the advantage, over a mechanical shutter, of avoiding the need for moving parts.

Shutters 23 and 23' are controlled by a control system 36. The purpose of shutter 23 is to alternately allow incident radiation 40 to reach back side 11a of wafer 10 and block incident radiation 40 from reaching back side 11a of wafer 10. When shutter 23 is open, incident radiation 40 reaches back side 11a of wafer 10 and the signals produced by detectors 32 and 34 represent the responses of detectors 32 and 34 to the combination of reflected radiation 42 and emitted radiation 44. When shutter 23 is closed, incident radiation 40 is blocked from reaching back side 11a of wafer 10, so no radiation 42 is reflected from back side 11a of wafer 10 and the signals produced by detectors 32 and 34 represent the responses of detectors 32 and 34 to emitted radiation 44 only. Subtracting the signals produced by detectors 32 and 34, when shutter 23 is closed, from the signals produced by detectors 32 and 34, when shutter 23 is open, provides difference signals that represent the responses of detectors 32 and 34 to reflected radiation 42 only. Shutter 23' is optional. The purpose of shutter 23' is to block all radiation from processing chamber 14 from reaching detectors 32 and 34, to allow correction for electronic drifts that are internal to apparatus 20.

Control system 36 also includes a processor 38 that processes the signals from detectors 32 and 34 to obtain an estimate of the temperature of wafer 10.

As an alternative to using shutter 23, control system 36 provides incident radiation 40 intermittently by turning radiation source 28 on and off. When radiation source 28 is on, the signals produced by detectors 32 and 34 represent the responses of detectors 32 and 34 to the combination of reflected radiation 42 and emitted radiation 44. When radiation source 28 is off, the signals produced by detectors 32 and 34 represent the responses of detectors 32 and 34 to emitted radiation 44 only.

As another alternative to shutter 23, apparatus 20 includes a rotating slotted disc, similar to the rotating slotted disk taught by Patton, to cause detectors 32 and 34 to receive alternately both reflected radiation 42 and emitted radiation 44 from back side 11a of wafer 10, or only emitted radiation from back side 11a of wafer 10.

Figure 2B:
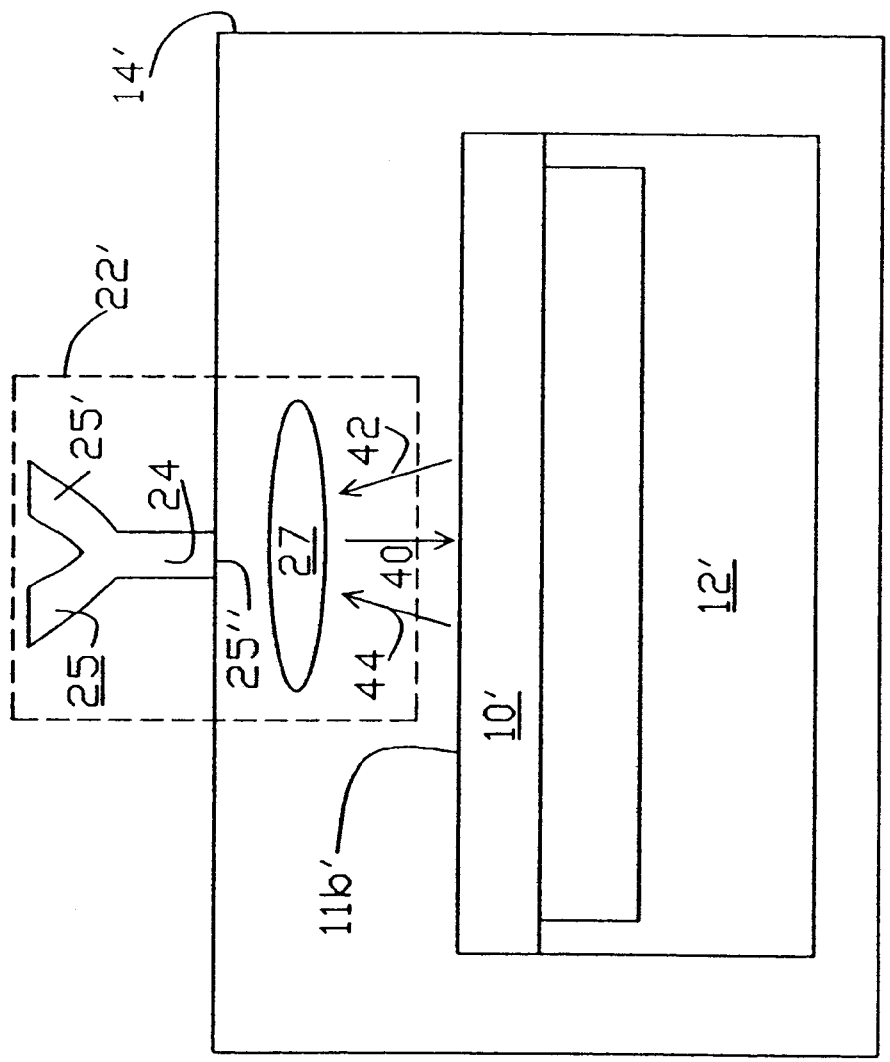

FIG. 2B shows an alternative embodiment 22' of optical head 22, used to measure the temperature of a wafer 10' positioned on a support 12' in a processing chamber 14'. Like support 12, support 12' may be either a chuck or a pedestal. Optical head 22' is positioned relative to processing chamber 14' to direct incident radiation 40 onto front side 11b' of wafer 10' and to receive reflected radiation 42 and emitted radiation 44 from front side 11b' of wafer 10'. Like optical head 22, optical head 22' includes bifurcated fiber optics cable 24. Instead of quartz rod 26, however, optical head 22' includes a focusing optical system that is represented in FIG. 2B by a convex lens 27. Focusing optical system 27 and bifurcated fiber optics cable 24 are positioned so that front side 11b' of wafer 10' is at one focal plane of focusing optical system 27 and distal end 25" of bifurcated fiber optics cable 24 is at the other focal plane of focusing optical system 27. Note that both illustrated embodiments of apparatus 20, the embodiment of FIG. 2A that uses optical head 22 and the embodiment of FIG. 2B that uses optical head 22', receive reflected radiation 42 and emitted radiation 44 from the location on wafer 10 or 10' upon which incident radiation 40 impinges.

Figure 3:
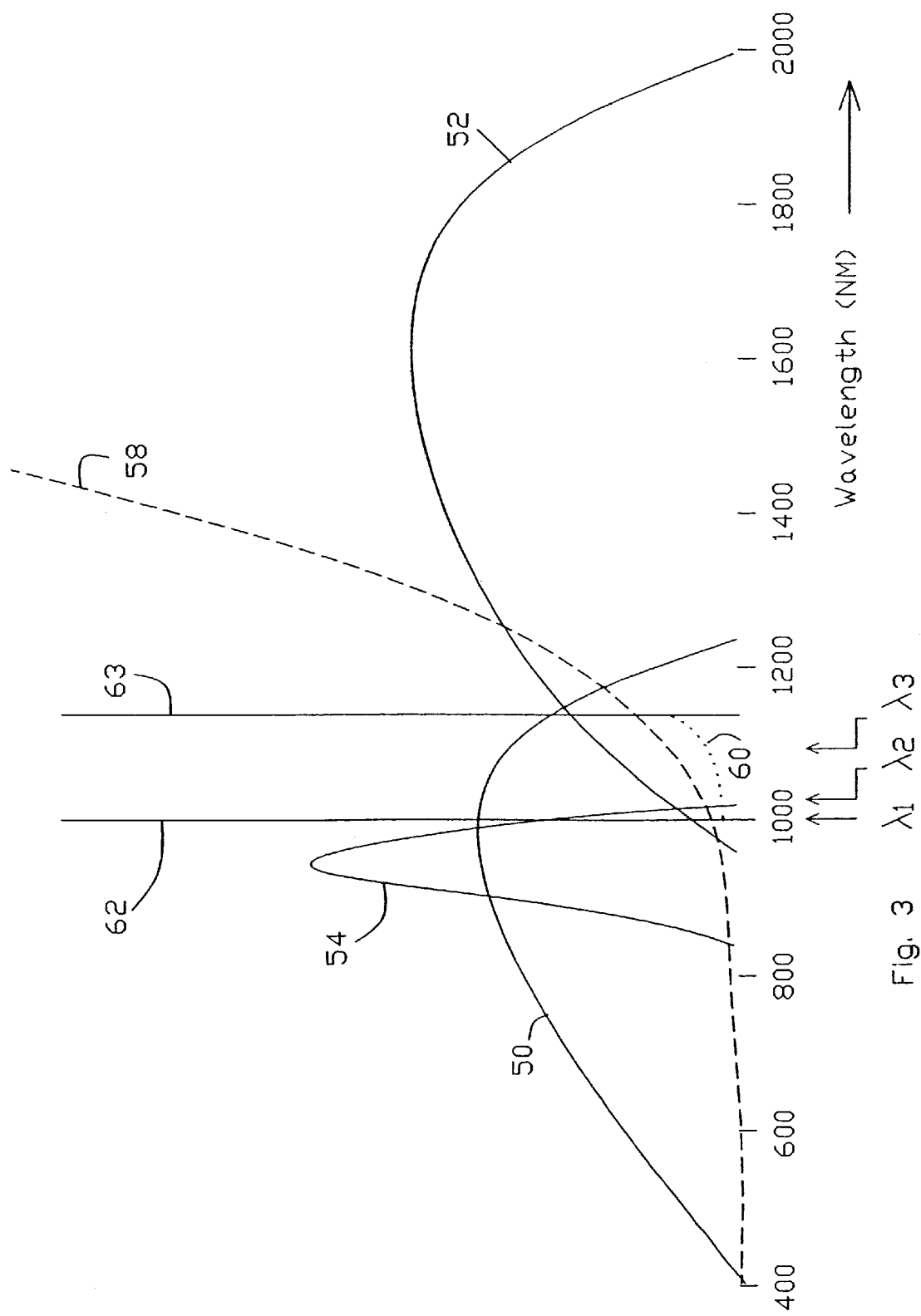
FIG. 3 shows, schematically, various spectra that are relevant to the present invention.

FIG. 3 shows, schematically, various spectra, as functions of wavelength λ, that are relevant to the present invention. Curve 50 represents the sensitivity spectrum of silicon detector 32. Curve 52 represents the sensitivity spectrum of germanium detector 34. Curve 54 represents the output spectrum of radiation source 28. Vertical lines 62 and 63 represent the low and high cutoff wavelengths, respectively, of filter 30, so that the effective irradiation spectrum is the portion of curve 54 that lies between vertical lines 62 and 63. The effective spectral range in which silicon detector 32 receives reflected radiation 42 is the product of curve 50 and the portion of curve 54 that lies between vertical lines 62 and 63. The effective wavelength of the emissivity estimate derived by processor 38 from the signal obtained from silicon detector 32 is the weighted average wavelength obtained using this product as a weight. This effective wavelength is denoted by $\lambda_1$ in FIG. 3. The effective spectral range in which germanium detector 34 receives reflected radiation 42 is the product of curve 52 and the portion of curve 54 that lies between vertical lines 62 and 63. The effective wavelength of the emissivity estimate derived by processor 38 from the signal obtained from germanium detector 34 is the weighted average wavelength obtained using this product as a weight. This effective wavelength is denoted by $\lambda_2$ in FIG. 3.

Dashed line 58 is a representative Planck's function curve, at one particular temperature in the temperature range of interest during the processing of wafer 10. In this temperature range, curve 58 grows exponentially with increasing wavelength in the wavelength range depicted in FIG. 3, and the peak of curve 58 is considerably to the right of FIG. 3. For example, a curve 58 corresponding to a temperature of 1450° K. has its peak at about 3 microns, and a curve 58 corresponding to a temperature of 300° K. has its peak at about 10 microns. Detector 32 is used to detect emitted radiation 44, so that the effective sensitivity spectrum of detector 32 to emitted radiation 44 is the product of the portions of curves 50 and 58 which lie in the passband of filter 30, between vertical lines 62 and 63. This effective sensitivity spectrum is shown in FIG. 3 as a dotted line 60. The effective wavelength of the emissivity that should be used in correcting the black-body temperature estimate is the weighted average wavelength obtained using this product as a weight. This effective wavelength is denoted by $\lambda_3$ in FIG. 3. Note that 3 is a function of the temperature of wafer 10 because Planck function 58 is a function of temperature.

Given the emissivity values $\epsilon_1$ at wavelength $\lambda_1$ and $\epsilon_2$ and wavelength $\lambda_2$, the emissivity $\epsilon_3$ at wavelength $\lambda_3$ is estimated by linear extrapolation:

$$\epsilon_3 = \epsilon_2 + P(\epsilon_2 - \epsilon_1) \tag{4}$$

Figure 1:
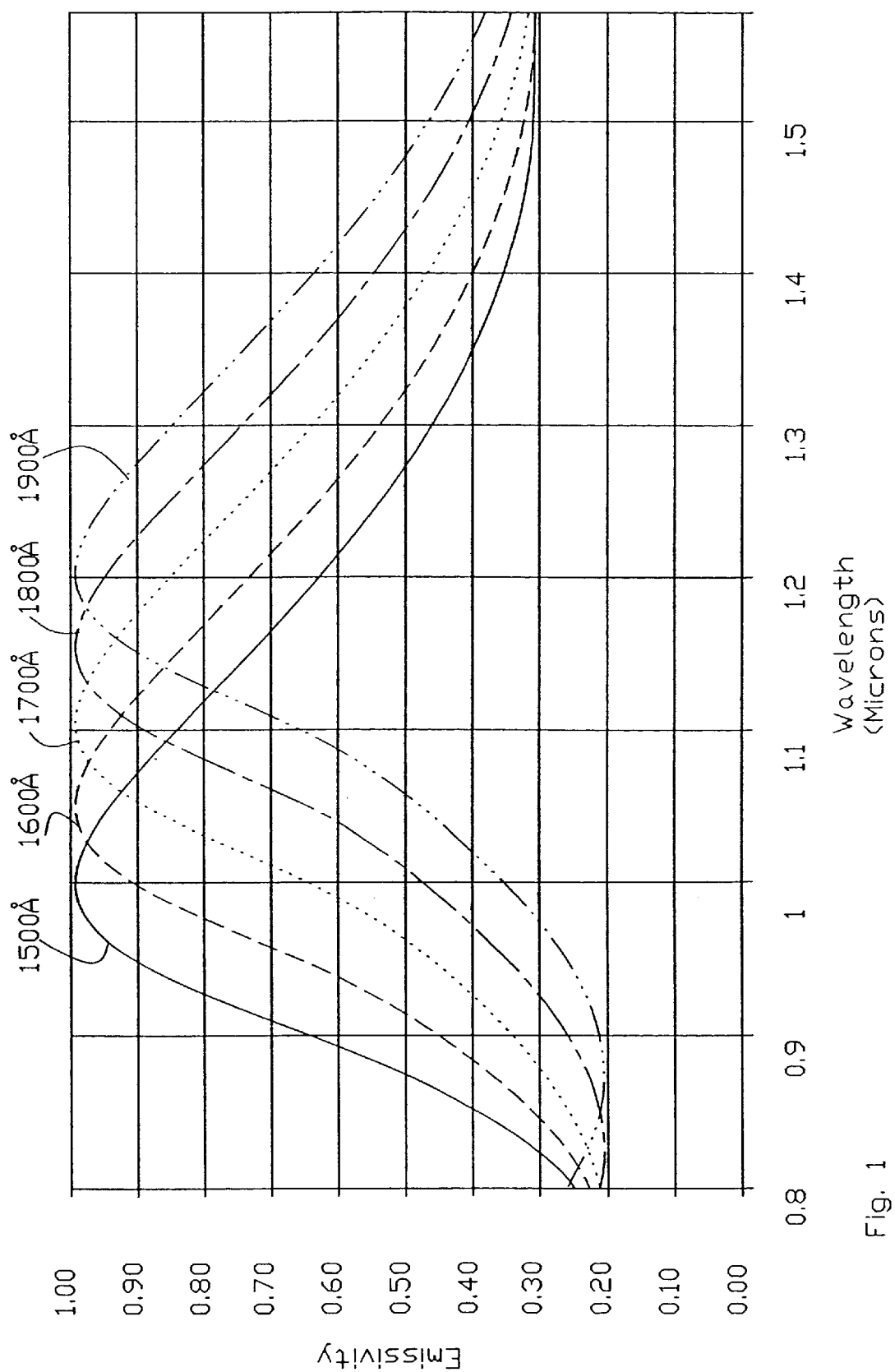
FIG. 1 is a plot of emissivities, as functions of wavelength, of a silicon wafer with 1000 Å of silicon dioxide and varying thicknesses of polysilicon deposited thereon.

Mathematically, the extrapolation factor P is given by $P = (\lambda_3 - \lambda_2)/(\lambda_2 - \lambda_1)$. It has been found experimentally that, for wafers 10 exhibiting emissivity curves such as those illustrated in FIG. 1, if $\lambda_1$ and $\lambda_2$ are chosen as described above in connection with FIG. 3, this linear extrapolation of $\epsilon_3$ yields temperature measurements whose accuracy is within the desired tolerance. The presence of $\lambda_3$ in this expression makes P a function of the temperature of wafer 10 via curve 60. Because the temperature of wafer 10 is not known a priori (and is indeed precisely what apparatus 20 is intended to determine), curve 60 is not known a priori, and so $\lambda_3$ is not known a priori. It has been found empirically that, in the temperature range of interest, P is a quadratic function of the temperature T of wafer 10:

$$P = T^2 A_1 + T A_2 + A_3 \tag{5}$$

where $A_1$, $A_2$ and $A_3$ are constants determined by calibrating apparatus 20 using wafers 10 of known temperature, for example, wafers 10 with embedded thermocouples. When measuring the temperature of a wafer 10 of unknown temperature, the correct value of P is determined by iteration. First an initial value of T is assumed, an initial value of $\epsilon_3$ is determined using equations (4) and (5) and this initial value of $\epsilon_3$ is used to correct the measured blackbody temperature of wafer 10 to obtain a new value of T. This value of T is used to obtain a new value of $\epsilon_3$, and the process is iterated to convergence. In practice, one iteration step has been found sufficient to achieve the desired accuracy.

In general, the various wavelength ranges used herein are chosen to be such that wafer 10 is opaque in those wavelength ranges. This allows the use of equation (3) to infer emissivity from reflectivity. If wafer 10 were partly transmissive in the wavelength ranges used herein, then the general form of Kirchoff's law, $$\epsilon + R + \tau = 1 \tag{6}$$

where τ represents transmissivity, would have to be used, and it would be necessary to obtain estimates of the transmissivity of wafer 10 at wavelengths $\lambda_1$ and $\lambda_2$. In addition, the wavelength ranges used herein are chosen to be sufficiently close to each other to justify the approximation, inherent in equation (4), that the emissivity of wafer 10 is a linear function of wavelength.

Apparatus 20 has the advantage that radiation from wafer 10 is measured in three relatively narrow wavelength bands using only two detectors 32 and 34 and only one filter 30. This is in contrast to prior art methods in which one or two detectors are used together with one narrow filter for each wavelength. This use of fewer components makes apparatus 20 more compact and less costly than comparable prior art apparati. The placement of the low wavelength cutoff of filter 30 relatively close to the high wavelength tail of the output spectrum of radiation source 28, as illustrated in FIG. 3, has as a consequence that the two subbands of the output spectrum of radiation source 28, in which the two reflectivity measurements are made, are relatively narrow. The qualitative difference between sensitivity spectrum 50 of silicon detector 32 and sensitivity spectrum 52 of germanium detector 34, specifically, that sensitivity spectrum 50 decreases with increasing wavelength and sensitivity spectrum 52 increases with increasing wavelength within the passband of filter 30, has as a consequence that the respective effective wavelengths, $\lambda_1$ and $\lambda_2$, of the two reflectivity subbands, are significantly different. For a similar reason, the effective wavelength $\lambda_3$ of sensitivity of detector 32 to emitted radiation 44 is different from both $\lambda_1$ and $\lambda_2$.

Low and high wavelength cutoffs 62 and 63 in FIG. 3, 1000 nm and 1150 nm, respectively, are illustrational rather than limitative. In general, low and high wavelength cutoffs 62 and 63 are selected in accordance with the process requirements and in accordance with the processing environment of wafer 10.

Wafer 10 typically is transparent to infrared radiation at long wavelengths and is opaque to infrared radiation at short wavelengths. The transition zone between the short wavelengths to which wafer 10 is opaque and the long wavelengths to which wafer 10 is transparent is termed the "absorption edge". This absorption edge is a function of the temperature of wafer 10, which in turn is a function of the environment of wafer 10 within chamber 14. Specifically, as the temperature of wafer 10 increases, the absorption edge of wafer 10 shifts to longer wavelengths. Consequently, wafer 10 acts as a high pass filter for environmental background radiation, and high wavelength cutoff 63 is related to a lower bound on the temperature of wafer 10 that can be measured without undue interference from environmental background radiation that transits wafer 10 from front side 11b to back side 11a. High wavelength cutoff 63 is selected with reference to the absorption edge of wafer 10, the lowest temperature to be measured and the intensity of the background radiation. Under conditions of relatively intense background radiation, wavelength cutoff 63 must be lower, to obtain an accurate measure at the lowest desired temperature, than under conditions of relatively weak background radiation.

Low wavelength cutoff 62 is selected to provide a passband of the desired width. A relatively wide passband has the advantage of providing a higher signal-to-noise ratio, as more photons are collected by detectors 32 and 34. A relatively narrow passband is advantageous in the presence of relatively intense background radiation, to force effective wavelengths $\lambda_1$, $\lambda_2$ and $\lambda_3$ to be relatively narrow and relatively close to each other, with a consequent increase in the accuracy of the temperature measurement despite the background radiation.

For example, rapid thermal processing (RTP) is performed at temperatures between about 400° C. and about 1250° C. Wafer 10 is heated to these temperatures by heating lamps that operate at a temperature of about 3000° C., at which temperature these heating lamps emit radiation whose maximum intensity is at a wavelength of about 1000 nm. The relative positioning of optical head 22 and wafer 10 is that illustrated in FIG. 2A, with optical head 22 directing incident radiation 40 towards back side 11a of wafer 10 and receiving reflected radiation 42 and emitted radiation 44 from back side 11a of wafer 10. The heating lamps are positioned on the opposite side of wafer 10 from optical head 22, so that the radiation from the heating lamps is incident on front side 11b of wafer 10. To keep the radiation from the heating lamps from overwhelming detectors 32 and 34 at the low end of the desired temperature range, high wavelength cutoff 63 can be placed at about 955 nm. To preserve accuracy, the passband must be a relatively narrow 10 nm, so that low wavelength cutoff 62 is placed at about 945 nm.

As another example, the temperature range in PVD is between about 200° C. and about 600° C., and there are no strong background radiation sources. Furthermore, PVD deposits an opaque metallic coating on front side 11b of wafer 10 that further blocks the background radiation. This allows high wavelength cutoff 63 to be placed at about 1145 nm. Note that this high wavelength cutoff 63 is higher than high wavelength cutoff 63 of RTP, despite the low-end temperature of 200° C. in PVD being lower than the 400° C. low-end temperature of RTP. The weak background radiation of PVD allows a wider passband of about 150 nm, for enhanced signal-to-noise, so that low wavelength cutoff 62 is placed at about 995 nm.

Figure 4:
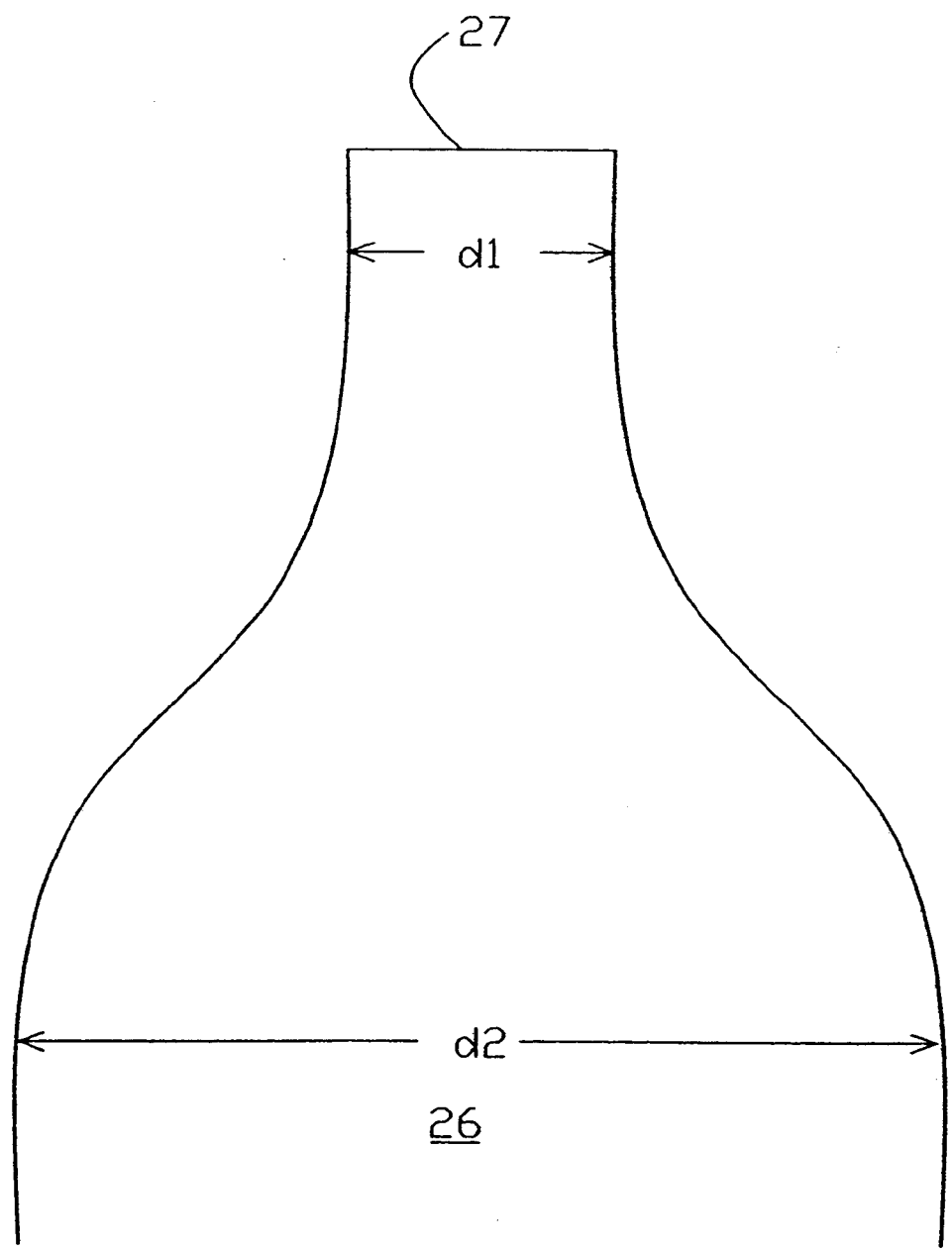
FIG. 4 shows a variant of the quartz rod of FIG. 2A.

FIG. 4 shows a variant of quartz rod 26, shaped to further enhance the effective emission/acceptance angle of quartz rod 26. Although quartz rod 26 transmits or accepts radiation over a full hemisphere (180° acceptance angle), fiber optic cable 24 limits the effective acceptance angle to about 80°. Therefore, distal end 27 is tapered, to give distal end 27 a smaller diameter $d_1$ than the diameter $d_2$ of the rest of quartz rod 26. If an untapered quartz rod has an effective acceptance angle of $\alpha$, then tapered quartz rod 26 of FIG. 4 has a larger effective acceptance angle of $\alpha d_2/d_1$.

The output of radiation source 28 tends to change over time, both because the output of radiation source 28 is temperature-dependent and because radiation source 28 tends to deteriorate over time. The variation of the output of radiation source 28 with temperature is minimized by conventional temperature stabilization. The deterioration of radiation source 28 over time is compensated by an initial calibration of the reflectivity measurements of apparatus 20 followed by periodically repeated calibrations at times when there is no wafer 10 present in chamber 14.

The initial calibration of the reflectivity measurements of apparatus 20 is implemented at installation and then is repeated periodically, preferably monthly. This calibration uses a reference wafer 10 of known reflectivity $R_{ref}$. Reference wafer 10 can be, for example, a standard bare silicon wafer at a temperature of at least 300° C. With radiation source 28 turned on, processor 38 receives from silicon detector 32 a signal (voltage) $V_{no}$ when no wafer is present in chamber 14 and a signal $V_{ref}$ when this reference wafer 10 is present in chamber 14. Subsequently, when a production wafer 10 is present in chamber 14 and a signal V is received from silicon detector 32 by processor 38 with radiation source turned on, the reflectivity R of wafer is 10 expressed as:

$$R = \frac{V - V_{no}}{V_{ref} - V_{no}} R_{ref} \qquad (7)$$

This relationship holds because the signals from detector 32 depend linearly on the intensities of the radiation that reaches detector 32 from wafer 10. The portions of signals V and $V_{ref}$ that are due to this radiation is assumed to be additive with the signal $V_{no}$ that is received by processor 38 in the absence of a wafer.

When apparatus 20 is used in a production mode, there usually are times, referred to herein as "idle times", when wafer 10 is absent from chamber 14, for example, when wafers are transferred from chamber to chamber. In wafer processing applications that use single wafer processing chambers, the sequence of events is that a wafer 10 is placed in chamber 14 for a few minutes for processing and then is removed from chamber 14 while the next wafer 10 is moved into place. In the time interval between the removal of one wafer 10 from chamber 14 and the placement of the next wafer 10 in chamber 14, apparatus 20 does not see a wafer. Therefore, this idle time is used for measurement of $V_{no}$ and for automatic recalibration of apparatus 20. In the case of an apparatus 20 configured as illustrated in FIG. 2A, i.e., with optical head 22 looking at back side 11a of wafer 10 from inside support 12, when there is no wafer 10 in chamber 14, the only sources of reflected light in chamber 14 that can reach quartz rod 26 are the walls of chamber 14, and these walls are sufficiently far from quartz rod 26 that the resulting reflection signal is very low. Empirically, a value of R less than 0.01 corresponds to the absence of a wafer 10 from chamber 14. This absence of a wafer from chamber 14 means that the entire signal V is a result of reflections of incident radiation 40 from various optical interfaces in optical head 22. If the production process allows the introduction of a reference wafer 10 into chamber 14 during idle time, then the full calibration procedure is repeated, to provide new values of both $V_{ref}$ and $V_{no}$. Otherwise, it is assumed that both $V_{ref}$ and $V_{no}$ have changed by the same ratio due to degradation of radiation source 28, so the old value of $V_{ref}$ is adjusted by multiplying the old value of $V_{ref}$ by $V/V_{no}$, and then $V_{no}$ is replaced by V.

The recalibration procedure described above is intended for use with an apparatus 20 that is positioned in chamber 14 to receive reflected radiation 42 from back side 11a of wafer 10, as illustrated in FIG. 2A. In that case, the signals received by processor 38 from detectors 32 and 24 when wafer 10 is absent from chamber 14 are very small compared to the signals received by processor 38 from detectors 32 and 24 when wafer 10 is present in chamber 14. Then the value of R obtained using equation (7) is relatively insensitive to small changes in $V_{no}$ due to environment drift or to noise. If apparatus 20 is positioned in chamber 14 to receive reflected radiation 14 from front side 11b' of wafer 10, as illustrated in FIG. 2B, then, when wafer 10 is absent from chamber 14, apparatus 20 receives reflected radiation from support 12, so that the signals in the absence of wafer 10 from chamber 14 are comparable to the signals in the presence of wafer 10 in chamber 14. Then equation (7) is not adequate, because a small change or drift in $V_{no}$ may produce a large error in the calculated value of R. In this case, calibration is performed using two reference wafers 10 of known reflectivity, to significantly improve the accuracy of the compensation for the degradation of radiation source 28. It is assumed that the signal V obtained from a wafer of reflectivity R is linear in R:

$$V = aR + b \qquad (8)$$

If a first reference wafer 10 of known reflectivity $R_1$ produces a signal $V_1$ and a second reference wafer 10 of known reflectivity $R_2$ produces a signal $V_2$, then the slope a and intercept b of equation (8) are:

$$a = \frac{V_2 - V_1}{R_2 - R_1} \qquad (9)$$

$$b = \frac{V_1 R_2 - V_2 R_1}{R_2 - R_1} \qquad (10)$$

so that the reflectivity R, of a production wafer 10 that produces a signal V, is given by:

$$R = \left(\frac{R_2 - R_1}{V_2 - V_1}\right)(V - V_2) + R_2 \qquad (11)$$

The initial calibration is done on the two reference wafers 10, with both $V_1$ and $V_2$ being stored in the memory of control system 36. Subsequently, the output drift of radiation source 28 can be corrected in two ways, analogous to the procedure described above in relation to equation (7). The first way is to repeat both measurements of $V_1$ and $V_2$ prior to measuring V of a production wafer 10, and replacing the old values of $V_1$ and $V_2$ with the new values of $V_1$ and $V_2$. The second way is to measure the signal provided by only one reference wafer 10, say signal $V_1$, and to assume that $V_2$ can be corrected by multiplying the old value of $V_2$ by the ratio of the new value of $V_1$ to the old value of $V_1$.

Alternatively, if the output of radiation source 28 is stable over time, a similar calibration procedure is used to correct for changes over time of the optical interface between wafer 10 and detectors 32 and 34, of detectors 32 and 34 themselves and of he electronics of control system 36.

The optical interface between wafer 10 and detectors 32 and 34 may change over time because of a variety of effects, including, inter alia, degradation of quartz rod 26, and deposition of some of the material, that is being deposited on front side 11b of wafer 10 during the processing of wafer 10, on distal end 27 of quartz rod 26. The properties of detectors 32 and 34 themselves, and of the electronic components of control system 36, also may change over time. Similar effects also plague prior art systems that are used to infer the temperatures of semiconductor wafers, as these wafers are processed sequentially in a chamber such as chamber 14, from measurements of the radiation emitted by the wafers. The standard way to compensate for these effects is to calibrate the system initially, using either a calibration wafer equipped with an embedded thermocouple or a standard blackbody radiation source at a known temperature, and subsequently to interrupt the processing sequence, reintroduce the calibration wafer or the standard blackbody radiation source to the chamber, and calibrate again. In practice, this interruption of the flow of wafers through the processing chamber, in order to perform the recalibration, is a significant inconvenience. Furthermore, the standard blackbody source is a fairly large and cumbersome instrument.

According to the present invention, an initial calibration is performed using a reference wafer 10 in chamber 14. Incident radiation 40 from source 28 is reflected from back side 11a of reference wafer 10 as reflected radiation 42 that is received, after filtering by filter 30, by detector 32. Processor 38 records the signal, $V_{init}$, that processor 38 receives from detector 32 as a consequence of the receipt of reflected radiation 42 by detector 32.

Now, reference wafer 10 is included along with the workpiece wafers 10 that are actually to be processed, in the wafer cassette that feeds wafers 10, one by one, into chamber 14 for processing. Note that this inclusion of reference wafer 10 in the processing sequence is possible because reference wafer 10 lacks a thermocouple. The thermocouple-equipped calibration wafer of the prior art can not be inserted into the processing sequence in this manner. When, during the processing sequence, reference wafer 10 arrives at chamber 14, instead of processing reference wafer 10, the calibration procedure is repeated. Incident radiation 40 from source 28 is reflected from back side 11a of wafer 10 as reflected radiation 42 that is received, after filtering by filter 30, by detector 32. As a result of the receipt of reflected radiation 42 by detector 32, processor 38 receives a signal $V_{subs}$ from detector 32. Because of the changes that have occurred in the optical interface between wafers 10 and detector 32, in detector 32 itself and in the electronics of control system 36 since the initial calibration, $V_{subs}$ may be different than $V_{init}$. Processor 38 calculates the correction ratio $$\rho = \left( \frac{V_{init} - V_{no}^{init}}{V_{subs} - V_{no}^{subs}} \right) \quad (12)$$

where $V_{no}^{init}$ is the signal received by processor 38 from detector 32 during the initial calibration when no wafer 10 is present in chamber 14 and $V_{no}^{subs}$ is the signal received by processor 38 from detector 32 during the initial calibration when no wafer 10 is present in chamber 14. Because the change overtime in the optical interface between wafer 10 and detector 32 may include partial occlusion of distal end 27 of quartz rod 26, $V_{no}^{init}$ may be different than $V_{no}^{subs}$. Signals, that are received by processor 38 from detector 32 during the processing of workpiece wafers 10 that follow reference wafer 10 in the processing sequence, are multiplied by this correction ratio to compensate for the changes over time in the optical interface between wafer 10 and detector 32, in detector 32 itself and in the electronics of control system 36. In particular, the signals from detector 32 that represent radiation emitted by subsequent workpiece wafers 10 are multiplied by this correction ratio prior to the inferring of the temperatures of these wafers 10 from these signals. In this manner, apparatus 20 is recalibrated with minimal interruption in the processing of workpiece wafers 10.

It should be noted that the same reference wafer 10 need not be used in both the initial calibration and in the subsequent calibration. For example, both reference wafers 10 may be substantially identical, and in particular have substantially identical reflectivities. Alternatively, two reference wafers 10 of known reflectivities ($R_{init}$ for reference wafer 10 of the initial calibration and $R_{subs}$ for reference wafer 10 of the subsequent calibration) are used, with $V_{subs}$ in the denominator of the right hand side of equation (12) then being multiplied by $R_{init}/R_{subs}$.

Figure 5:
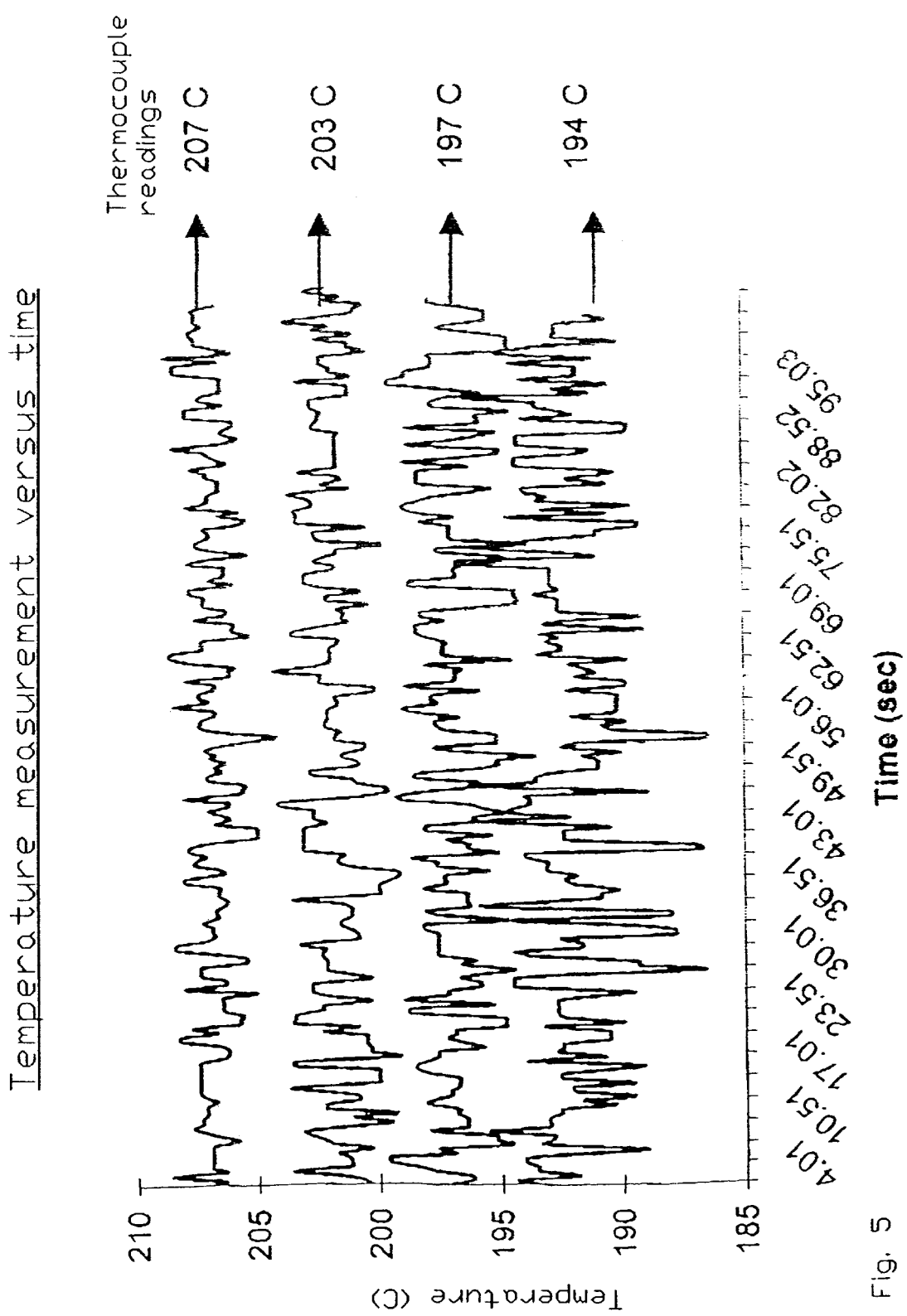
FIG. 5 shows plots of temperature readings, as functions of temperature, obtained using the apparatus of FIG. 2.

FIG. 5 shows an example of typical measurements performed using apparatus 20. Specifically, FIG. 5 shows temperature readings obtained for a highly doped bare silicon wafer 10 with an embedded thermocouple, using apparatus 20. The abscissa is time. The ordinate is the temperature of wafer 10, in ° C., as measured by apparatus 20. Each curve is labeled, on the right side of FIG. 5, with the temperature of wafer 10 as measured by the thermocouple during the corresponding experimental run. FIG. 5 illustrates the actual signal to noise ratio performance achieved at the lowest temperature at which apparatus 20 is normally used, for a wafer undergoing processing by physical vapor deposition. The peak to peak noise at 200° C. is ±2.5° C. The signal to noise ratio is higher at higher temperatures because the signal increases with increasing temperature while the noise remains about the same.

While the invention has been described with respect to a limited number of embodiments, it will be appreciated that many variations, modifications and other applications of the invention may be made.

What is claimed is:

1. A method for determining a temperature of a body that emits radiation at a plurality of wavelengths, the body having an emissivity that varies with wavelength, the body being located in an environment, the body having an absorption edge that depends on the environment, the method comprising the steps of:

(a) determining the emissivity of the body in an irradiation wavelength band;

(b) inferring the emissivity of the body in a first emission wavelength band, different from said irradiation wavelength band, from said emissivity in said irradiation wavelength band;

(c) receiving radiation emitted by the body in said first emission wavelength band;

(d) measuring a first signal representative of an intensity of the emitted radiation received from the body in said first emission wavelength band; and (e) inferring the temperature of the body from said first signal and from the emissivity determined in said first emission wavelength band.

2. The method of claim 1, wherein said determining of the emissivity of the body in said irradiation wavelength band is effected by steps including measuring at least one reflectivity of the body in said irradiation wavelength band.

3. The method of claim 2, wherein said measuring of said at least one reflectivity in said irradiation wavelength band is effected by steps including:

(i) directing incident radiation of a first spectral range at the body;

(ii) receiving at least a portion of said incident radiation of said first spectral range reflected from the body; and (iii) measuring a signal representative of an intensity of said reflected radiation of said first spectral range, using a detector sensitive in a second spectral range;

a product of said first and second spectral ranges being a first subband of said irradiation wavelength band.

4. The method of claim 3, wherein said measuring of said at least one reflectivity in said irradiation wavelength band is effected by steps further including:

(iv) passband filtering said received portion of said reflected radiation;

said measuring of said signal representative of said intensity of said reflected radiation being effected on said filtered radiation, so that said first subband of said irradiation wavelength band is a product of said first and second spectral ranges and said passband.

5. The method of claim 4, wherein said measuring of said at least one reflectivity in said irradiation wavelength band is effected by steps further including:

(v) selecting said passband in accordance with said environment.

6. The method of claim 5, wherein said passband has a high cutoff wavelength that is selected with reference to the absorption edge of the body.

7. The method of claim 4, wherein said receiving of said radiation emitted by the body is effected by steps including passband filtering said radiation emitted by the body in said passband that is used to passband filter said received portion of said reflected radiation.

8. The method of claim 3, wherein said measuring of said at least one reflectivity in said irradiation wavelength band is effected by steps further including:

(iv) directing incident radiation of a third spectral range at the body;

(vi) receiving at least a portion of said incident radiation of said third spectral range reflected from the body; and (vii) measuring a signal representative of an intensity of said reflected radiation of said third spectral range, using a detector sensitive in a fourth spectral range;

a product of said third and fourth spectral ranges being a second subband of said irradiation wavelength band.

9. The method of claim 8, wherein said measuring of said at least one reflectivity in said irradiation wavelength band is effected by steps further including:

(viii) passband filtering said received portions of said reflected radiation;

said measuring of said signals representative of said intensities of said reflected radiation of said first and third spectral ranges being effected on said filtered received portions of said reflected radiation, so that said first subband of said irradiation wavelength band is a product of said first and second spectral ranges and said passband, and so that said second subband of said irradiation wavelength is a product of said third and fourth spectral ranges and said passband.

10. The method of claim 9, wherein said measuring of said at least one reflectivity in said irradiation wavelength band is effected by steps further including:

(ix) selecting said passband in accordance with said environment.

11. The method of claim 10, wherein said passband has a high cutoff wavelength that is selected with reference to the absorption edge of the body.

12. The method of claim 9, wherein said receiving of said radiation emitted by the body is effected by steps including passband filtering said radiation emitted by the body in said passband that is used to passband filter said received portions of said reflected radiation.

13. The method of claim 6, wherein said first and third spectral ranges are substantially identical.

14. The method of claim 3, wherein said directing of said incident radiation at the body, said receiving of said reflected radiation from the body, and said receiving of said emitted radiation from the body all are effected using a common optical head.

15. The method of claim 14, further comprising the step of:

(f) positioning said common optical head relative to the body so that said inferred temperature is substantially independent of a superficial roughness of the body.

16. The method of claim 14, further comprising the step of:

(f) providing said common optical head with a shape that renders said inferred temperature substantially independent of a superficial roughness of the body.

17. The method of claim 1, wherein said inferring of the emissivity of the body in said first emission wavelength band is effected by linear extrapolation.

18. The method of claim 17, wherein said linear extrapolation includes a temperature-dependent coefficient, and wherein said inferring of the temperature of the body is effected iteratively.

19. The method of claim 1, further comprising the steps of:

(f) inferring, from said emissivity in said irradiation wavelength band, the emissivity of the body in a second emission wavelength band that is different from both said irradiation wavelength band and said first emission wavelength band; and (g) measuring a second signal representative of an intensity of the emitted radiation received from the body in said second emission wavelength band;

said inferring of the temperature of the body then being based on said first and second signals and on the emissivity determined in said first and second emission wavelength bands.

20. An apparatus for determining a temperature of a body, comprising:

(a) a radiation source for emitting radiation in a first spectral range;

(b) a detection mechanism for detecting radiation in a first subband of said first spectral range and in a second subband of said first spectral range, and for detecting radiation emitted by the body in at least one emission wavelength band different from said first and second subbands; and (c) a common optical head for directing said radiation in said first spectral range towards the body and for receiving, from the body, said radiation in said first and second subbands and said radiation in said at least one emission wavelength band.

21. The apparatus of claim 20, further comprising:

(d) a control system: for activating said radiation source to direct incident radiation at the body via said common optical head; for receiving, from said detection mechanism, a signal representative of an intensity of said incident radiation in said first subband reflected from the body and detected by said detection mechanism via said common optical head; for receiving, from said detection mechanism, a signal representative of an intensity of said incident radiation in said second subband reflected from the body and detected by said detection mechanism via said common optical head; for receiving, from said detection mechanism, at least one signal representative of an intensity of said radiation emitted by the body in a respective said at least one emission wavelength band; and for inferring the temperature of the body from said signals.

22. The apparatus of claim 20, wherein said control system includes a processor for determining an emissivity of the body in said first subband from said signal representative of said intensity of said reflected incident radiation in said first subband, for determining an emissivity of the body in said second subband from said signal representative of said intensity of said reflected incident radiation in said second subband, for inferring an emissivity of the body in said at least one emission wavelength band from said emissivities in said irradiation wavelength band, and for inferring the temperature of the body from said at least one signal representative of said intensity of said radiation emitted by the body in said respective at least one emission wavelength band and from said inferred emissivity.

23. The apparatus of claim 20, wherein said detection mechanism includes:

(i) a first detector for detecting radiation in a second spectral range that includes both said first subband and a first of said at least one emission wavelength band, said first subband being a product of said first and second spectral ranges; and (ii) a second detector for detecting said radiation in a third spectral range that includes said second subband, said second subband being a product of said first and third spectral ranges.

24. The apparatus of claim 23, wherein said first detector is at least partly transparent to said radiation in said second subband.

25. The apparatus of claim 24, wherein said first detector and said second detector are in tandem, so that at least some of said radiation in said second subband that is received by said common optical head traverses said first detector before being received and detected by said second detector.

26. The apparatus of claim 25, wherein said detection mechanism further includes:
   (iii) a passband filter, in tandem with said first and second detectors, said radiation that is received by said common optical head traversing said passband filter before being received and detected by said first and second detectors, so that said first subband and said emission wavelength band are defined by both said first detector and said passband, and so that said second subband is defined by both said second detector and said passband.

27. The apparatus of claim 23, wherein said detection mechanism detects radiation emitted by the body in two different emission wavelength bands, said second spectral range including a first of said two emission wavelength bands and said third spectral range including a second of said two emission wavelength bands.

28. The apparatus of claim 20, further comprising:
   (d) a mechanism for positioning said common optical head relative to the body so that the temperature of the body, as determined by the apparatus, is substantially independent of a superficial roughness of the body.

29. The apparatus of claim 20, wherein said common optical head includes a distal end, the apparatus further comprising:
   (d) a mechanism for positioning said common optical head with said distal end facing the body;
and wherein said distal end is shaped so as to render the temperature of the body, as determined by the apparatus, substantially independent of a superficial roughness of the body.

30. An apparatus for determining a temperature of a body, comprising:
   (a) an optical head for receiving radiation emitted by the body, and
   (b) a mechanism for positioning said optical head relative to the body so that the temperature of the body, as determined by the apparatus, is substantially independent of a superficial roughness of the body.

31. An apparatus for determining a temperature of a body, comprising:
   (a) an optical head, having a distal end, for receiving radiation emitted by the body; and
   (b) a mechanism for positioning said optical head with said distal end facing the body;
and wherein said distal end is shaped so as to render the temperature of the body, as determined by the apparatus, substantially independent of a superficial roughness of the body.

32. A method of measuring the temperature of each of a plurality of workpiece bodies as the workpiece bodies are processed sequentially, comprising the steps of:
   (a) providing a reference body;
   (b) providing an apparatus for directing incident radiation at said reference body, receiving reflected radiation from said reference body, receiving emitted radiation from each workpiece body as said each workpiece body is processed, and inferring, from said emitted radiation, the temperature of said each workpiece body;
   (c) performing an initial calibration of said apparatus with respect to said reference body, prior to the processing of the workpiece bodies;
   (d) including said reference body in the sequence of workpiece bodies, with at least one of the workpiece bodies following said reference body in the sequence;
   (e) performing a subsequent calibration of said apparatus with respect to said reference body, during the processing of the workpiece bodies; and
   (f) for each workpiece body in the sequence:
      (i) receiving said emitted radiation from said each workpiece body, and
      (ii) inferring the temperature of said each workpiece body from said emitted radiation,
         said inferring of the temperature of each said at least one workpiece body that follows said reference body in the sequence being effected with reference to said calibrations.

33. The method of claim 32, wherein each of said calibrations is effected by directing said incident radiation at said reference body and measuring a signal representative of said reflected radiation from said reference body, and wherein said inferring of the temperature of each said at least one workpiece body that follows said reference body in the sequence is effected with reference to a ratio of a function of said signal from said initial calibration to said function of said signal from said subsequent calibration.

34. A method of measuring the temperature of each of a plurality of workpiece bodies as the workpiece bodies are processed sequentially, comprising the steps of:
   (a) providing first and second reference bodies having known reflectivities;
   (b) providing an apparatus for directing incident radiation at one of said reference bodies, receiving reflected radiation from said one of said reference bodies, receiving emitted radiation from each workpiece body as said each workpiece body is processed, and inferring, from said emitted radiation, the temperature of said each workpiece body;
   (c) performing an initial calibration of said apparatus with respect to said first reference body, prior to the processing of the workpiece bodies;
   (d) including said second reference body in the sequence of workpiece bodies, with at least one of the workpiece bodies following said second reference body in the sequence;
   (e) performing a subsequent calibration of said apparatus with respect to said second reference body, during the processing of the workpiece bodies; and
   (f) for each workpiece body in the sequence:
      (i) receiving said emitted radiation from said each workpiece body, and
      (ii) inferring the temperature of said each workpiece body from said emitted radiation,
         said inferring of the temperature of each said at least one workpiece body that follows said second reference body in the sequence being effected with reference to said calibrations.

35. The method of claim 34, wherein each of said calibrations is effected by directing said incident radiation at a respective reference body and measuring a signal representative of said reflected radiation from said respective reference body, and wherein said inferring of the temperature of each said at least one workpiece body that follows said reference body in the sequence is effected with reference to a ratio of a function of said signal from said initial calibration to said function of said signal from said subsequent calibration corrected for said known reflectivities.

* * * * *